United States Patent [19]
Klancnik

[11] 3,733,006
[45] May 15, 1973

[54] WORK PIECE FEEDER FOR MACHINE
[76] Inventor: Adolph V. Klancnik, 1020 Glenview Road, Glenview, Ill.
[22] Filed: July 12, 1971
[21] Appl. No.: 161,777

[52] U.S. Cl. .................................. 221/262, 221/270
[51] Int. Cl. ............................................. B65g 59/00
[58] Field of Search ...................... 221/270, 268, 262

[56] References Cited
UNITED STATES PATENTS
3,114,477  12/1963  Dixon ............................. 221/262 X
2,944,499  7/1960  Schaufelberger ................ 221/262 X Primary Examiner—Allen N. Knowles
Attorney—James B. Kinzer, et al.

[57] ABSTRACT

Work pieces (nuts, studs, fasteners, etc.) in a magazine guideway are advanced from a temporary holding position to a locating position, there to be worked on by a rotating tool.

The work pieces are apertured, and a positive feed force is applied by a feed finger fitting the aperture in the work piece incidental to moving the work piece from the holding position to the locating position. Means are presented by switching the path of the feed finger into and out of the guideway. Thus, the feed finger is normally in the guideway during its advance stroke; at the end of the advance stroke, which is also the inception of the feed finger return stroke, the switch means is effective to move the feed finger out of the guideway; and at the end of the return stroke, the feed finger is restored or switched back to the guideway in engagement with the next work piece to be advanced.

In one embodiment, the advance stroke of the feed finger moves the work piece in one step from holding position to locating position opposite the tool; in another embodiment, the work piece is advanced incrementally in stages to the holding position opposite the tool.

9 Claims, 11 Drawing Figures

Inventor
Adolph V. Klancnik
By Kinzer, Dorn and Zickert
Attorneys

Inventor
Adolph V. Klancnik
By Kinzer, Dorn and Zickert
Attorneys

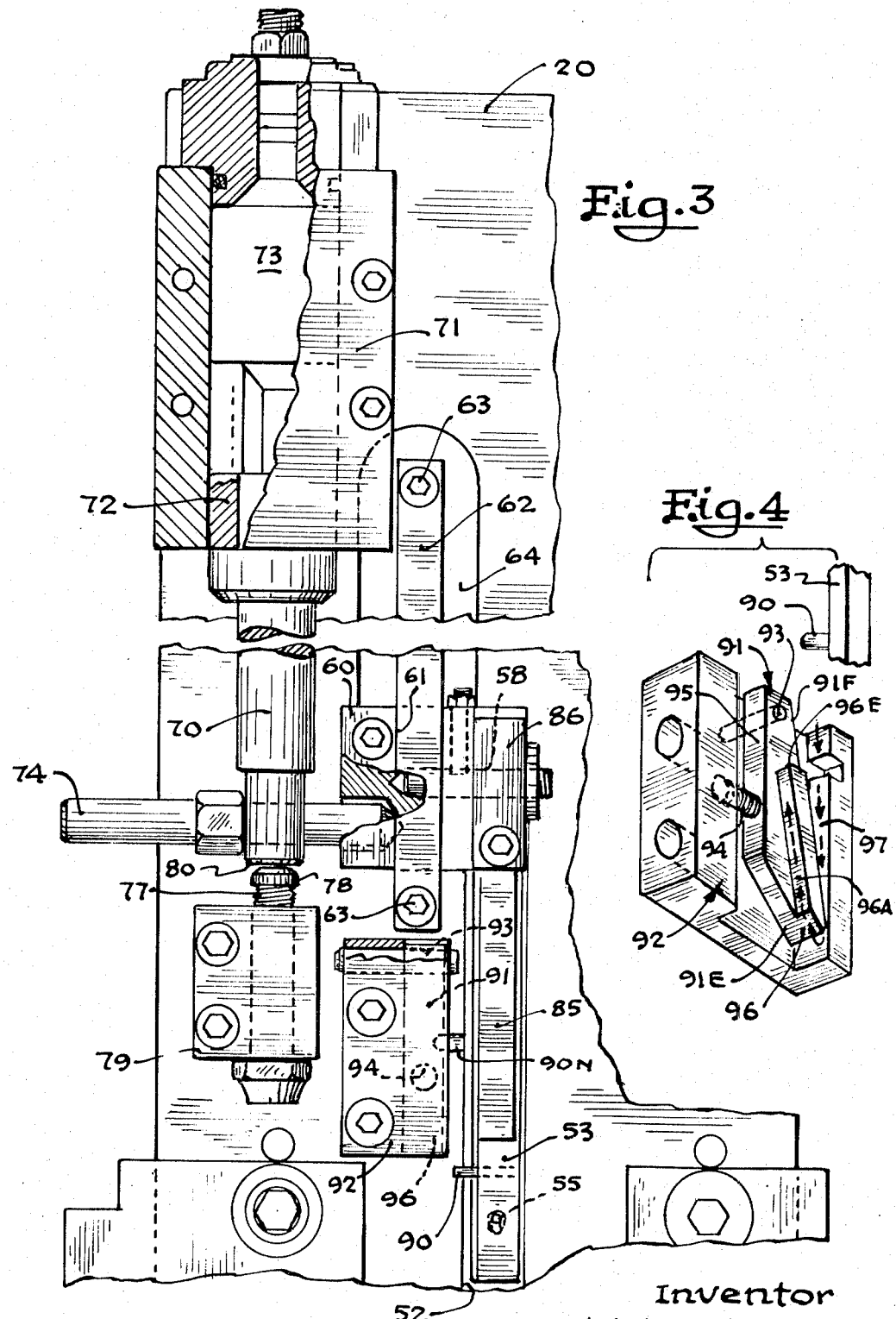

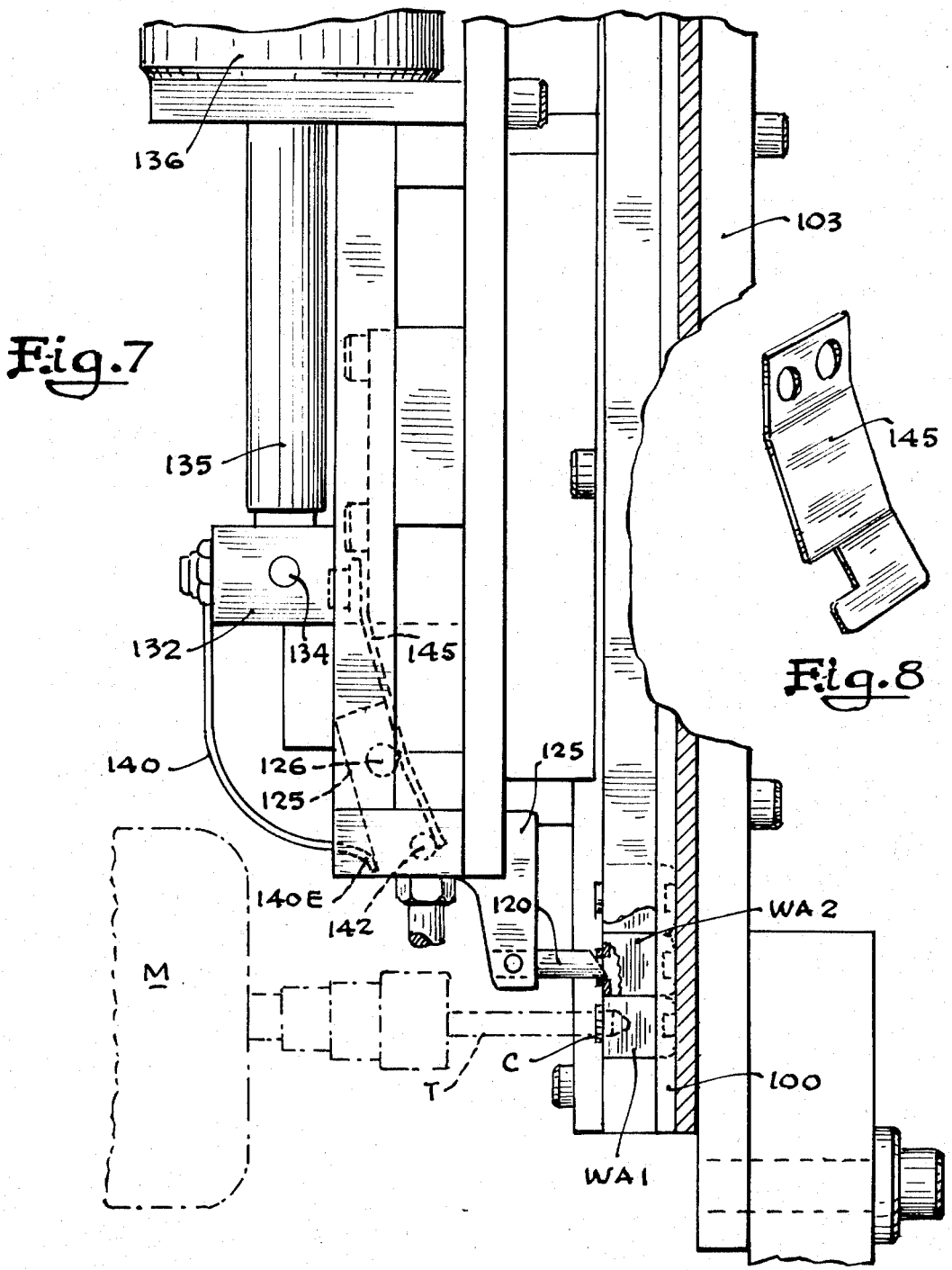

WORK PIECE FEEDER FOR MACHINE

This invention relates to apparatus for feeding small parts to the work station of a machine tool.

Small work pieces such as nuts, studs and fasteners, having a preformed aperture therein, may be stacked one on another in a magazine slot for ultimate positioning at a work station where a rotating tool machines the aperture. The machining operation may be tapping, counter-boring or similar work exerted on the aperture of the work piece.

Reference is made to work pieces having a preformed aperture therein because the present invention utilizes this feature to assure positive feed and positioning of the work piece at the work station. The present invention is also concerned with relatively small pieces which are of light-weight character. Such work pieces in a supply magazine often jam, especially in the instance of nuts or the like having more than four sides, particularly since the dimensions are small and the weight insufficient for there to be assurance that a reliable gravity feed will occur. In addition, work pieces of small size require truly accurate location at the work station in order that the aperture in the work piece will be on the center line or feed axis of the rotating tool.

In light of the foregoing and for other reasons, the primary object of the present invention is to feed work pieces forcefully and accurately to a locating position characterizing the work station of a machine tool, and to do this by means of a feed finger carried on a reciprocal support and operating in such a manner that the feed finger during an advance stroke will be engaged in the aperture of the work piece to move it forcefully and precisionally toward the work station, will be reversed and withdrawn from the guideway at the end of the advance stroke, and at the end of the reverse or return stroke will be switched and is restored to the guideway to engage the aperture of the next work piece. Related objects of the present invention are to accomplish switching of the feed finger by a unique switch plate advantageously relating and interlocking different tracks for a follower on the feed finger support, and to compactly allow for reciprocal motions having close tolerance.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention.

In the drawings:

FIG. 3 is an elevation at the opposite side of the apparatus, compared to FIG. 1, partly in section;

FIG. 4 is a compound perspective view showing one form of switch means and the follower on the feed finger support related thereto;

FIG. 7 is an elevation, partly in section, of the opposite side of the apparatus shown in FIG. 5; and FIG. 8 is a perspective view of the switch means associated with the apparatus shown in FIG. 5.

Figure 1:
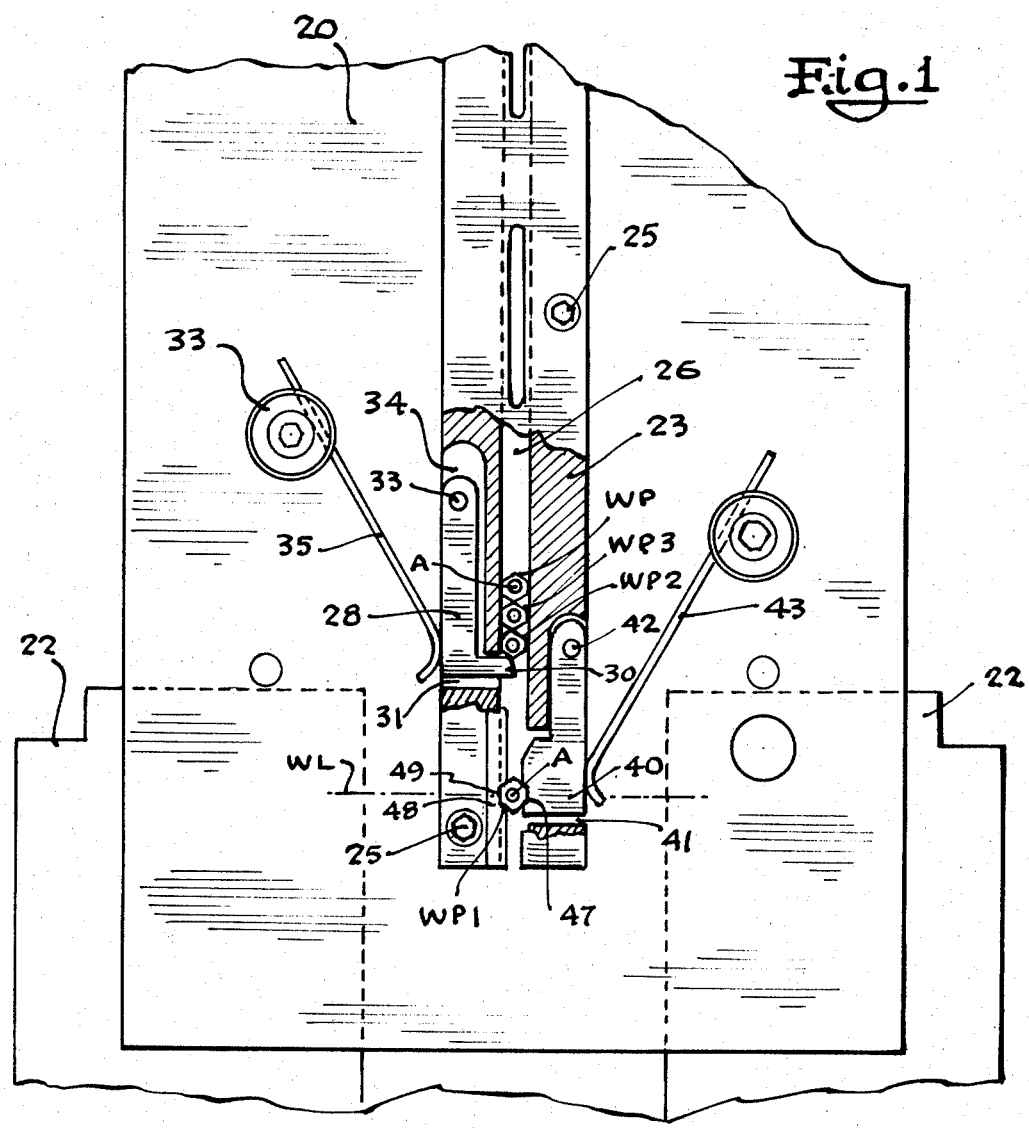
FIG. 1 is an elevation, partly in section, of a magazine type feeder apparatus representing one embodiment of the present invention.

FIGS. 1 through 4 show one form of a magazine type feeder apparatus in which work pieces WP, FIG. 1, are to be advanced one by one to a locating position at a work station where each work piece is to be worked on by a rotating tool. Referring further to FIG. 1, work piece WP1 is at the locating position characterizing the work station, compared to work piece WP2 at a holding station and representing the next work piece to be advanced to the work station. The work station and the locating position are coincident. The center line WL, FIGS. 1 and 2, identifies the working axis of the rotating tool (not shown) which may be assumed to be a tapping tool for forming a thread in the aperture A, FIG. 1, of each work piece as WP.

Figure 2:
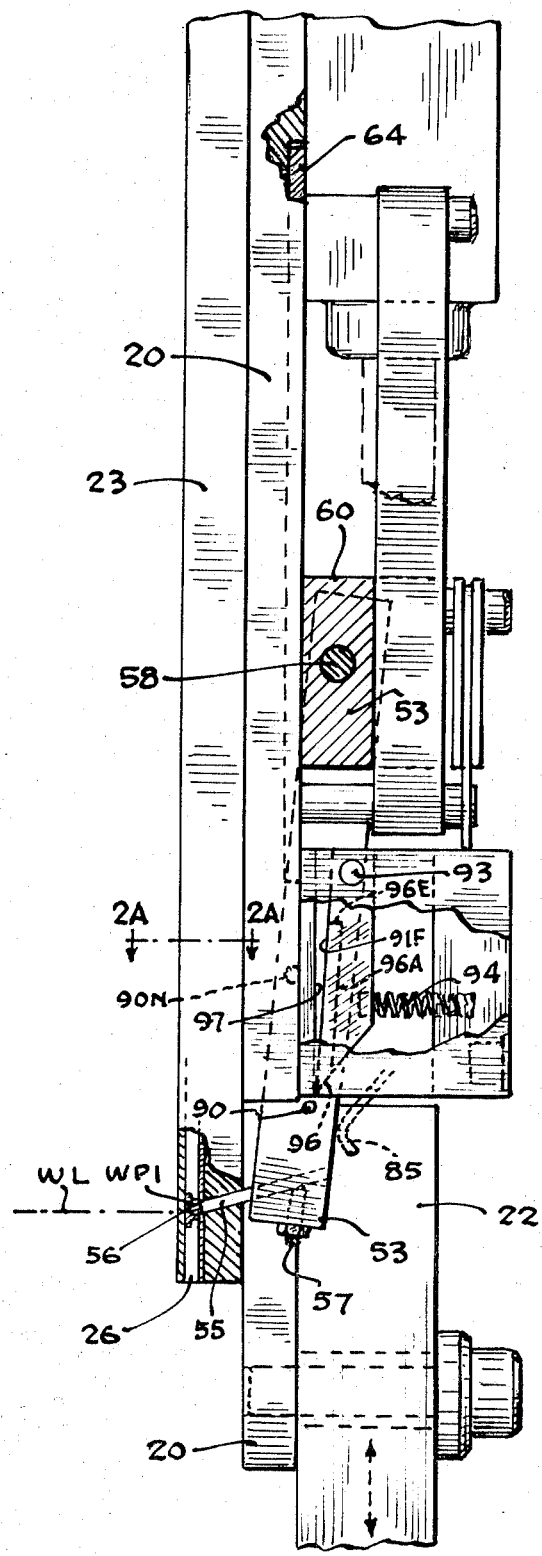
FIG. 2 is a side elevation of the apparatus shown in FIG. 1, partly in section.
Figure 2A:
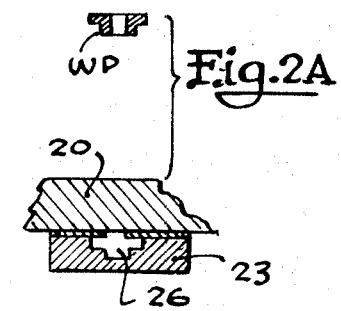
FIG. 2A is a compound view showing the magazine guideway in section and the work piece related thereto.

The feed apparatus, FIG. 1, comprises a mounting plate 20 which will be normally in an upright position. The mounting plate will ordinarily be secured to upright support bars 22 constituting a part of the machine tool as a whole. A slotted bar 23 is secured to the front of the mounting plate by set screws or other suitable fasteners 25. The bar 23 is provided with a guide slot 26 which, as best shown in FIG. 2A, has a cross section neatly accommodating a vertical stack of work pieces WP which are in the form of relatively small, six-sided nuts. As will be apparent in FIG. 1, the work pieces WP are stacked one upon another in the guideway 26, normally moving downward therein by gravity flow to a holding position characterized by a holding detent 28 to be described in more detail below. It will be recognized that the work pieces above the detent 28 are in point-to-point contact, which is the normal situation, and it is not an infrequent occurrence for jamming to take place between adjacent angles of adjacent work pieces. As a consequence, there may be a total failure for a work piece to arrive at the work station, to say nothing of the possibility of inaccurate positioning at the work station. Under the present invention this lack of predictability is overcome by a positive feed action conducted in a unique manner.

The way in which the work pieces are fed to the top of the magazine to drop the gravity to the detent 28 constitutes no part of the present invention, but, in the event, a work piece WP2 will be held at a holding position remote from the work station by the detenting finger 30 of the detent 28 disposed in the guideway 26 normally to interrupt downward movement of the work piece WP2 engaged thereby. The detent finger 30 slides in an opening or slot 31 formed in one side of the magazine bar 23, and the upper end of the detent 28 as a whole is pivotally mounted on a pin 33 located in a mounting slot 34 also formed in the same side of the magazine bar.

The detent 28 is biased or resiliently mounted by spring means so that the holding finger 30 is normally disposed in the guideway 26. Such bias is conveniently exerted by a torsion spring 35 having the free end thereof bearing on the outer face of the holding detent 28, the opposite end portion being tensioned on a mounting stud 36 secured to the face of the mounting plate 20 to which the magazine bar is fastened.

In the embodiment of the invention shown in FIG. 1, the increment of movement of work piece WP2 in the direction of the work station is the entirety of the displacement between the holding position (work piece WP2) and the locating position (work piece WP 1). Thus, the increment of movement is the entire displacement between the holding position represented by detent finger 30 and the locating position represented by the center line WL of the rotating tool.

The work station is further characterized by a locating detent 40 slidably fitted in a slot 41 at the side of the magazine bar 23 opposite the slot 31 in which the holding detent is slidably fitted. The locating detent 40 is pivotally mounted on a pin 42 for swinging movement and, like the holding detent, is biased inwardly in the direction of the guideway 26 by spring means in the form of a leaf spring 43 mounted and operating in the manner of the leaf spring 35, as will be apparent in FIG. 1. It will be appreciated that the spring means for biasing the detents may take different forms; equally so, the detents may move or shift in different ways.

The holding or positioning detent 40 may be advantageously shaped at its inner face in conformance with one side of the work piece so that one of the flat faces and two of the angles at one side of the work piece WP1 will be neatly accommodated in a complementally shaped notch 47 so that the work piece WP1 to be worked on by the rotating tool is tightly gripped at the work station.

Consideration will now be given to the feed means for forcefully moving a work piece from and past the holding station represented by the detent 28 downward to the positioning detent 40.

Referring to FIG. 3, the face of the mounting plate opposite the magazine is formed with a relatively wide slot 52 which communicates with the guideway slot 26, at least to the extent that the slot 52 in the mounting plate is coextensive with the guideway slot from a point somewhat above the holding station to a point below the work station for purposes apparent from the disclosure to follow. A reciprocal support in the form of an arm or bar 53, FIGS. 2 and 3, is located on the side of the mounting plate 20 having the slot 52. A feed finger 55 in the form of a pin, FIG. 2, is carried by the support 53 at the lower end thereof and projects forwardly therefrom through the guideway slot 26. The forwardmost end 56 of the feed finger is of reduced diameter to fit in and engage the aperture A of the work piece. The feed finger 55 is mounted in a corresponding aperture at the bottom of the support 53, FIG. 2, and is held tightly by a set screw 57 whereby the feed finger may be adjusted relative to the guideway 26.

The support bar 53 which carries the feed finger 55 is mounted pivotally on a pin 58, FIGS. 2 and 3, carried at the outer face of a slide block 60, FIG. 3. The slide block 60 is formed with a slot 61 which embraces a fixed guide bar 62 secured to the mounting plate 20 as by screws 63. The slide 60 fits flush against a wear plate 64 seated in a corresponding opening in the face of the mounting plate opposite the magazine.

The feed finger 55, as noted, has the reduced end 56 thereof normally disposed in the guideway 26 for longitudinal movement with respect thereto, and is moved, as will be described in detail, between a home position where the narrowed end thereof is in the aperture A of work piece WP2, at holding position, and an advanced position where the feed finger presents the engaged work piece WP2 to the positioning detent 40 at the positioning station.

The manifest aspect of the advance or downward stroke of the feed finger, imparted thereto by the reciprocal support 53, is to move the work piece WP2 at holding position past the detent 30 and downward in the guideway 26 into the locating jaw 47 of the positioning detent. At the inception of this advance stroke, the work piece WP2 cams the finger 30 of the holding detent to the left or clockwise, as viewed in FIG. 1. This action can be realized from the fact that the upper corner of the holding detent finger 30 bears against the "7 o' clock" side of the nut WP2. Further, it will recognized from the angulation at the upper left-hand corner of the positioning detent 40 that the work piece being advanced into the working station by the forceful action of the feed finger will cam the holding detent 40 to the right, or counter-clockwise as viewed in FIG. 1, and at the instant the work piece is in alignment with the notch 47 of the positioning detent 40, the latter will swing slightly back to the left and lock the work piece in the work station.

At all times, the feed finger is in the aperture A during its advance stroke, and the terminus of the advance stroke of the feed finger is the center line WL. If desired, there could be a configured anvil jaw in the guideway opposite the detent jaw 47. The precise form of detenting may vary widely under the present invention, and may be varied for different kinds of work pieces, it being essential only that there be a releasable detent at the holding station for interrupting the gravity flow of the work pieces downward in the guideway, allowing movement therepast of the work piece to be advanced in the direction of the work station, and that there be a releasable detent or similar resilient positioning means at the work station to hold the work piece stationary during the time the rotating tool is presented thereto. It will also be recognized that a work piece being moved into the work station, to be centered on the working axis WL of the tool, is effective to displace from the work station the previous, finished work piece, so clearly the positioning detent as 40 may and should be a strong one.

An advance and return stroke is imparted to the reciprocal support 53 by means of a piston rod 70, FIG. 3, which is coupled to the slide 60. Thus, a cylinder 71 is mounted on the same side of mounting plate 20 as the slide 60, and a piston 72 is disposed therein. The displacement chamber 73 in the cylinder preferably accommodates air under pressure for advancing and returning the piston 72, but hydraulic fluid may be used as well. In any event, a cross rod 74, FIG. 3, is fitted to the lower end of the piston rod 70 and one end thereof fits in an aperture of the slide 60 whereby reciprocal motion of the piston 70 is imparted to the slide 60 and in turn to the bar 53 which carries the feed finger.

Sequencing of fluid under pressure to the cylinder 73 is accomplished in any preferred manner, but importantly enough, a means is afforded to accurately determine the extent of the advance stroke of the feed finger so that the terminus of advance motion will be substantially coincident with the work station center line WL. In accomplishing this, a stop screw 77, FIG. 3, presenting a button stop 78 at its upper end, is mounted in a stop block 79 beneath the piston rod 70 so that the stop button 78 is in alignment with the lowermost end 80 of the piston rod 70. The screw 77 enables the stop button 78 to be advanced or retracted relative to the lower end of the piston rod 70 for corresponding adjustment of the effective stroke of the bar 53 and the feed finger carried thereby.

Under and in accordance with the present invention, the reciprocal support 53 is provided with a follower 90. Two tracks or guides are presented for the follower 90. The follower is on a first track during the time the feed finger is at and advances from home position, moving the work piece WP2 from the holding station toward the locating position at the work station. At the end of the advance stroke, the follower is presented to a rise constituting the second track for the follower. The rise is presented by a switch plate which may also be termed a cam plate because of the rise thereon.

The follower is on the second track during the reverse or return stroke of feed finger, displacing the feed finger from the guideway, and this displacement prevails until the feed finger returns to its home position whereupon the follower 90 is switched from the second track and restored to the first track.

The follower 90, FIG. 3, is secured to and projects outwardly from one side of the feed finger support 53 and of course reciprocates therewith. The follower 90 travels adjacent a switch plate 91 pivotally mounted in a cam block 92. Thus the upper end of the switch plate 91 as viewed in FIG. 4 is mounted pivotally on a pin 93 secured to an adjacent face of the cam block 92. A coil spring 94 is mounted on the cam block 92 and the free end thereof bears against one side 95 of the switch plate.

As already noted, the switch plate may also be viewed as a cam member inasmuch as it is machined to afford a sharply angled cam rise 96 having a continuation 96A.

At the commencement of the advance or downward stroke of the reciprocal support 53, the latter, under the influence of the spring 85, presents the free tip of the feed finger 55 to the aperture A of the work piece WP2 at holding position. This condition prevails throughout the extend of the advance stroke, and at this time the follower 90 is constrained by the spring means 85 to follow a first track or guide represented by a flange 97 on the cam block 92.

As shown in FIG. 4, the cam plate 91 has a switch end 91E presenting the cam rise 96. Spring 94 in the cam block is effective to urge the switch end of the switch or cam plate 91 into contact with the flange of the cam plate which presents the track or guide 97. Above the switch end, the face 91F of the plate 91, facing the track 97, is sloped away from the track 97 so that for most of its downward or advance travel the follower 90 is out of contact with plate 91. However, as the feed finger moves the advancing work piece into the holding jaw of the detent 40, the follower 90 bears against the switch plate 91 and pivots it toward the observer as viewed in FIG. 4, so that plate 91 swings out of the path of the advancing follower. As the downward or advance stroke ends, determined by the adjustment of the stop button 78, the follower clears the lower or switch end of the switch plate 91 and concurrently the work piece attains the working station, displacing the previous work piece entirely from the detent 40. The position of the feed finger 55 at this time is shown in FIg. 2, where the follower is now presented to the cam rise 96, in position to follow the cam rise 96 and its continuation 96A during the return movement of the support 53.

Thus at the inception of the return stroke of the feed finger the follower 90, FIG. 2, in effect has been switched from the first track 97 to the second track 96 and again will be constrained by spring 85 so as to follow track 96 and its continuation 96A.

As the follower 90 travels along the cam rise 96, the support 53 is shifted or swung counterclockwise as viewed in FIG. 2, displacing the feed finger from the work piece now gripped by the holding detent 40. Continued return movement of the support 53 is characterized by the feed finger displaced from the guideway 26, and this continues so long as the follower 90 is traveling on the second track 96A. The second track has an upper, terminal end 96E corresponding to the feed finger being returned to home position opposite the holding station represented by the holding detent finger 30 whereupon the follower 90 is switched by plate 91 from track 96A back to the first track 97, thus completing the loop or cycle.

The loop or cycle referred to characterizes the path of movement of the follower and may be recapitulated as follows: The feed finger 55 has advanced work piece WP1, FIG. 2, to the work station, and this was preceded by work piece WP1 knocking or kicking the previous work piece out of the work station. Work piece WP2 in the meantime is resting at holding position, reposing on the upper corner of the holding detent finger 30. Work piece WP3, FIG. 1, is reposing on work piece WP2, ready to take the place of work piece WP2 when the latter is displaced from the holding detent. The feed finger 55 in its advanced position, FIG. 2, is characterized by the follower 90 being presented to the return track which is the cam rise 96. As return movement of arm 53 is commenced, follower 90 moves outward on track 96, displacing the feed finger from the guideway, releasing work piece WP1 to the holding detent 40. Complete displacement of the feed finger 55 from the released work piece WP1 is realized at least by the time the follower attains the cam rise continuation 96A, and as the cam follower travels upward therealong such movement is manifest in continued movement of the feed finger toward its home position which is attained when the follower 90 reaches the end 96E of the second track whereupon the follower is switched to the first track 97 manifest in the feed finger being engaged in the aperture A of the work piece WP2. The next advance stroke of the reciprocal support 53 moves work piece WP2 out of holding position toward locating position, and work piece WP3 drops by gravity onto the holding detent finger 30.

In the embodiment of the invention above described, FIG. 1, the principal advantage of moving a work piece directly and in one step from holding position to locating position is that there is no chance for the part thus being transported to hang up or wedge against another. Additionally, there is no dependence on the necessity of one work piece moving the next work piece to the working station, which has often been an unreliable mode of transportation when the parts are in point-topoint contact as they would be in the instance of six-sided nuts, which is a problem related to the wedging or jamming problem mentioned above.

Another significant achievement is that the feed finger itself deposits the work piece at the work station and as a consequence the tension on the positioning detent 40 need only be sufficient to maintain the part stationary while it is being tapped. Detenting is simplified. In other words, the detent 40 is not required to stop the work piece, because the work piece is moved to the detent 40 by the positive action of the feed finger.

In this same embodiment, the moving parts (feed finger, feed finger support, piston rod) are on the side of the mounting plate opposite the approach of the tool indicated by the arrow head on line WL, FIG. 2. The tool has full access to the work piece and there need be no concern about overhanging parts interferring with the approach of the tool and its motor.

There can be no overfeeding because the stroke of the feed finger is accurately adjusted to terminate when the work piece is in the jaw of the locating detent; and inasmuch as the feed finger is forcefully withdrawn from the work piece moved to the work station, it is not dragging on a work piece during its return stroke which characterizes a feed finger which is only spring biased.

Figure 2B:
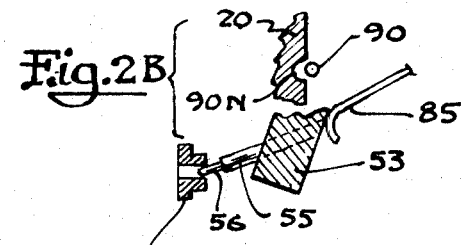
FIG. 2B is a compound view showing a safety feature as part of the invention.

It may be finally observed that if there is a jam in the guideway so that no work piece as WP2 is presented to the holding detent, then there is an automatic stop of the finger feed. Thus, and referring to FIG. 2B, this shows the general relation between the feed finger 55, the follower 90 and a work piece as WP2 properly located at the holding position, ready to be advanced to the work station on the next downward stroke of the feed finger support 53. At this time, the follower 90, carried by the same support 53, is directly opposite a stop shoulder 90N machined in the rear face of the support plate 20. Now, if there is no work piece WP2, FIG. 2B, the feed finger obviously will not engage the missing part and as a consequence will move laterally into the magazine guideway to take the place of the missing work piece, so to speak, because spring 85 forces it to do this. At the same time, the follower 90 moves onto the stop shoulder 90N, FIG. 2B, preventing downward movement of the feed finger support 53, signalling this fact to the attendant The embodiment of the invention shown in FIGS. 5 through 8 is representative of variations which may be entailed in handling work pieces of an entirely different kind compared to that shown in FIG. 2. Thus, the work piece WA, FIG. 5A, is an electrical terminal having flat upper and lower surfaces FU and FL, with a collar C projecting from one side thereof having an aperture AP which is to be tapped. Because the upper and lower surfaces are flat, there need be no concern about jamming as in the instance of nut-type work pieces, FIG. 2.

Figure 5:
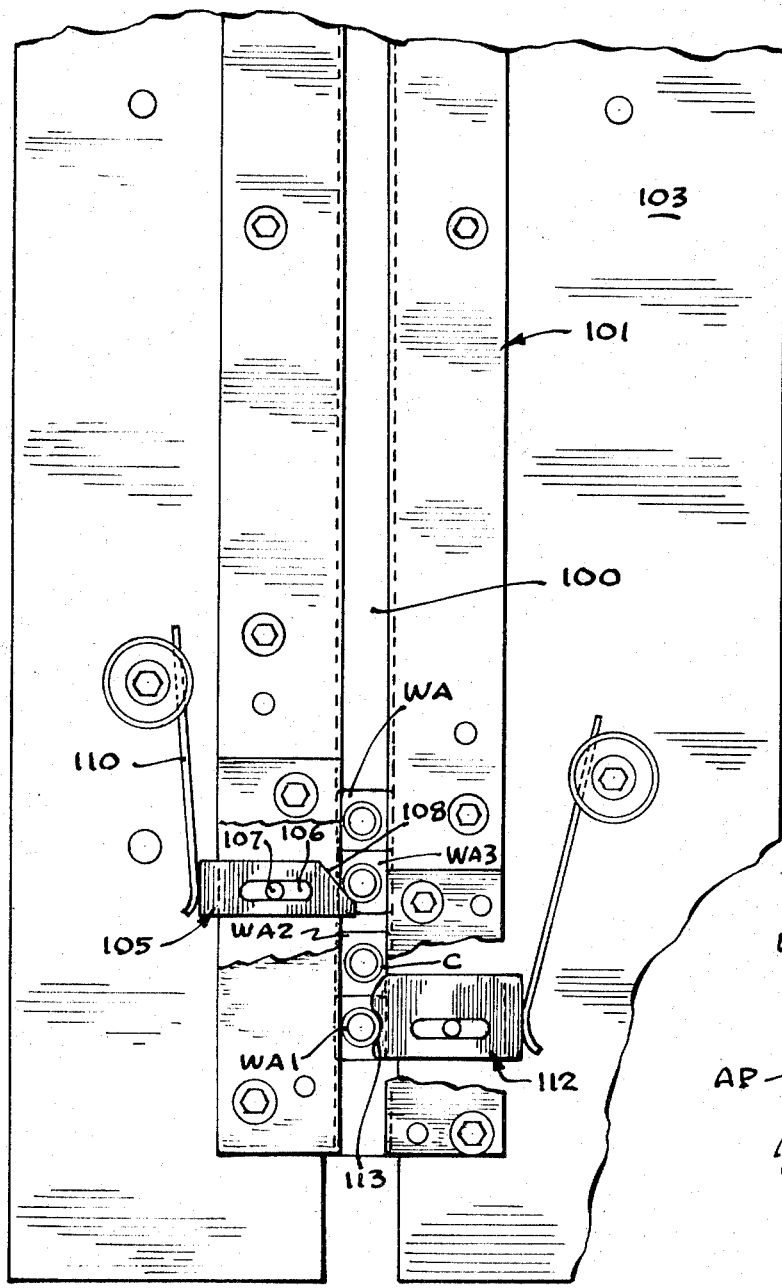
FIG. 5 is an elevation similar to FIG. 1 showing another embodiment of the invention.
Figure 5A:
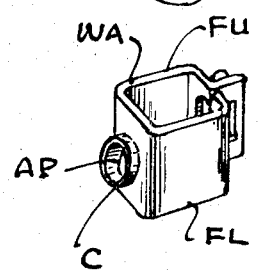
FIG. 5A is a perspective view of another form of work piece.

Again, the work pieces will be stacked one atop another in a guideway which in this instance is guideway 100, FIG. 5, presented by a magazine 101 in turn supported upon an upright mounting plate 103 so that the work pieces WA may gravitate downwardly therein until the lowermost one attains holding position defined by a holding detent 105 which is mounted in a slot at one side of the magazine 101.

The detent 105 is formed with an elongated slot 106 in which is disposed a guide pin 107 fixed at the inside of the magazine. The inner end of the detent 105 has an upwardly and outwardly inclined surface 108 in position to engage and stop the collar C of the work piece WA3. The detent 105 is biased inwardly to holding position by the leaf 110 of a torsion spring tensioned on a mounting stud, as will be apparent from FIG. 5. A downward force imparted to the work piece WA3 by a feed finger, hereinafter described, cams the detent to the left permitting escape of the work piece WA3.

A tapping tool T, FIG. 7, defines the center line of the work station. Referring to FIG. 5, the work piece WA1 is at the work station and is held stationary by a locating detent 112 guided and biased in the manner of the detent 105 as will be apparent in FIG. 5. The inner end of the detent 112 is configured with a locating jaw 113 shaped complemental to and engaging with the collar C of the work piece WA1 with the collar in position to be tapped by the tool T.

A work piece WA2 is at an intermediate position between the holding station and the locating station. Work piece WA2 will be responsible to displace work piece WA1 from the work station during the next feed stroke. To this extent, a standard approach is taken because the flat faces present no possibility of jamming as already noted.

Referring to FIG. 7, a feed finger or pin 120 has the inner or free end thereof engaged in the collar C of the work piece WA2, representing the most advanced position (downward) of the feed finger. In other words, in this embodiment, the feed finger travel is such that a work piece is moved from the holding station to the intermediate position represented by the position of work piece WA2 in FIG. 5. By this arrangement, FIG. 7, there is ample room for the approach of the tool T, making it possible to locate the feed structure, described in more detail below, on the same side of the support plate 103 as the tool T and its motor M.

The feed finger 120, FIG. 7, is carried by a reciprocating finger support in the form of a lever 125. The lever 125 is pivotally supported on a pin 126 carried by a reciprocal slide 132. The slide 132 is guided for vertical, reciprocal movement by a pair of guide bars 133, FIG. 6, and is secured as by a pin 134, FIG. 7, to the lower end of a piston rod 135 operated by air in a cylinder 136 which is sequenced to impart an advance and return stroke to the piston and its slide 132.

Figure 6:
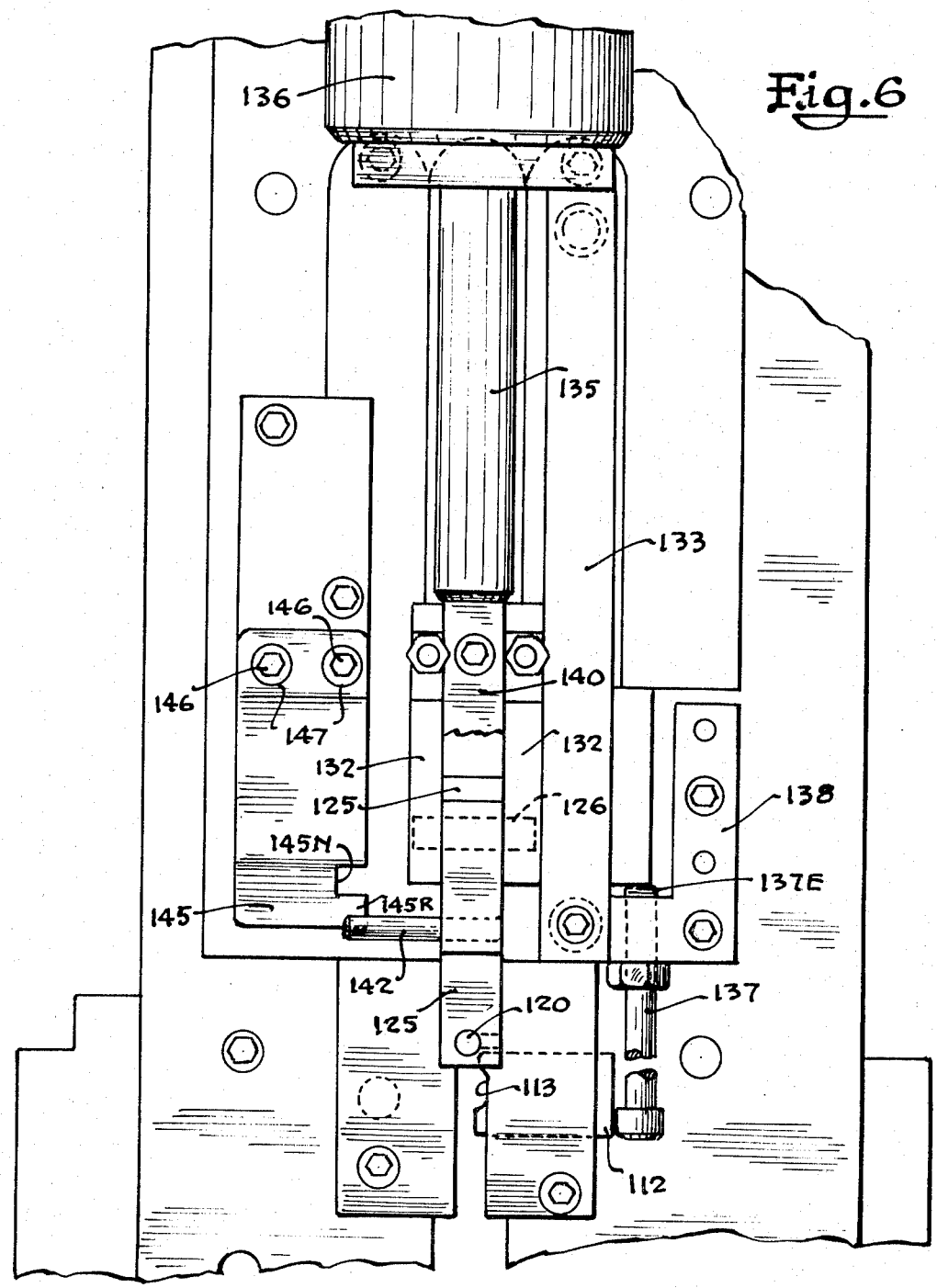
FIG. 6 is a rear elevation of the machine shown in FIG. 5.

A stop screw 137 is threadedly mounted for adjustment in a stop block 138, FIG. 6. The stop screw has a free end 137E, carefully adjusted to limit the advance stroke of the slide, and the feed finger and its support 125 as well, to that point where the work piece WA3 is advanced from the holding detent one increment to the position occupied by work piece WA2, FIG. 5.

It will be recognized from FIG. 7 that the feed finger support 125 is mounted on the pin 126 for pivotal movement laterally into and out of the guideway 100. The support 125 is spring biased in a counter-clockwise direction as viewed in FIG. 7. Such bias is exerted by a leaf spring 140 secured at its upper end to the slide 132 with its lower end 140E bearing against the feed finger support lever 125. Thus the spring 140 is normally effective to urge the feed finger 120 into contact with a work piece.

As in the foregoing embodiment, the feed finger is to be moved out of the work piece guideway during the return stroke of the means which impart reciprocal movement to the feed finger support. This is accomplished by equipping the feed finger support with a follower movable on two tracks, being switched from one to the other. Thus, referring to FIG. 6 a follower in the form of a pin 142 is secured to the support 125 and projects outwardly therefrom. The follower is associated with a cam plate 145 which in this instance is in the form of a strip of spring steel located on the side of the support 125 adjacent the follower 142.

FIG. 7 shows the position of the follower 142 at the attainment of the advance stroke of the feed finger 120. At this time, follower 142 is presented to the outer side of the cam plate 145 and more particularly is presented to a rise 145R constituting the track to be engaged by the follower 142 during the return stroke of the piston 135. The cam plate 145 is secured in a fixed position by screws 146, but the apertures for the screws are slotted, 147, to enable the track 145R for the follower to be adjusted.

As shown in FIG. 7, the cam plate is inclined downwardly and inwardly relative to the reciprocal path of the slide 132, and hence during return motion of the slide 132 the follower 142 moves upwardly and outwardly on the track 145R, forcing the support 125 to pivot clockwise against spring 140, whereupon the feed finger 120 is withdrawn from the aperture in work piece WA2.

As shown in FIG. 6, the cam plate 145 has a notch or dwell 145N characterizing the upper limit of the track 145R, so that when the follower 142 is presented to the notch 145N spring 140 is then effective on the support 125 to pivot the latter counter-clockwise as viewed in FIG. 7. This occurs at the time the feed finger 120 attains its return or home position, opposite the aperture of work piece WA3 which is retained in holding position by the detent 105.

During the next advance stroke, the follower 142 bears against the outer face of the left-hand one of the guides 133, using the guide as the other track during the time that work piece WA3 is moved downward in guideway 100.

I have illustrated and described two embodiments of the invention. It will be understood from this that further modifications and equivalent structure may be employed by those skilled in the art.

I claim:

1. In a magazine type feeder apparatus where work pieces are to be advanced one by one to a locating position at a work station where each work piece is to be worked on by a rotating tool: a magazine affording a guideway in which the work pieces are to be stacked one atop another for gravity movement to a holding detent at a holding station in the guideway spaced upwardly from said locating position, a feed finger carried by a reciprocal support for movement of the feed finger longitudinally of the guideway, said feed finger having a home position where the finger is engaged with a work piece at the holding station, means to impart an advance stroke to the support to advance the so-engaged work piece along the guideway toward the work station and at the end of the advance stroke to impart a return stroke to the support which returns the feed finger to home position for engagement with the next piece to be advanced, said support being pivotally mounted for lateral movement of the feed finger into and out of the guideway, a cam follower on the reciprocal support and means affording a first guide track on which the follower travels throughout the length of its advance stroke, a cam surface for moving the feed finger laterally out of the guideway at the commencement of said return stroke and for restoring the feed finger to its home position at the end of said return stroke, said cam surface having a rise constituting a second track for the follower during the return stroke of the reciprocal support, the second track ending at a point corresponding to the feed finger being at home position, and spring means holding the follower on said tracks, the cam rise being on one side of and commencing at the switching end of a switch plate, the opposite side of the switch plate facing the first track in spaced relation therewith to allow clearance for the follower at the commencement of its advance stroke but with the switching end of the switch plate resiliently engaging the first track and terminating just short of the terminus of advance travel of the follower so that the follower at the end of the advance stroke of the feed finger engages and swings the switch plate out of the way with the follower then in position to travel on the second track.

2. Apparatus according to claim 1 wherein the follower is engageable with and travels on a first guide track throughout the length of the advance stroke, said cam surface having a rise constituting a second track for the follower during the return stroke of the reciprocal support, the second track ending at a point corresponding to the feed finger being at home position, and spring means holding the follower on said tracks.

3. Apparatus according to claim 2 wherein the cam rise is on one side of and commences at the switching end of a switch plate, the opposite side of the switch plate facing the first track in spaced relation therewith to allow clearance for the follower at the commencement of its advance stroke but with the switching end of the switch plate resiliently engaging the first track and terminating just short of the terminus of advance travel of the follower so that the follower at the end of the advance stroke of the feed finger engages and swings the switch plate out of the way with the follower then in position to travel on the second track.

4. Apparatus according to claim 1 including a mounting plate, a magazine secured to one side of the mounting plate and affording the guideway, the holding detent being slidably fitted in said magazine, and said work station being defined by a work piece positioning detent slidably fitted in said magazine below the first-named detent.

5. Apparatus according to claim 4 in which a fluid-operated piston rod is mounted for reciprocal motion on the mounting plate, and means coupling the piston rod to the reciprocal arm.

6. Apparatus according to claim 5 including an adjustable stop for regulating the advance stroke of the reciprocal arm.

7. Apparatus according to claim 6 in which the feed finger, the reciprocal support for the feed finger and the piston rod are located on the side of the mounting plate opposite the approach of the tool.

8. In a magazine type feeder apparatus for a machine tool where work pieces are to be advanced to a locating position at a work station where each work piece is to have a tooling operation performed thereon: a magazine affording a guideway in which the work pieces are to move by gravity to a holding detent at a holding station in the guideway and from thence downward along the guideway to said locating position, a feed finger carried by a reciprocal support for movement of the feed finger longitudinally of the guideway, said feed finger having a home position where the finger is engaged with a work piece at the holding station, means to impart an advance stroke to the support to advance the so-engaged work piece along the guideway toward the work station and at the end of the advance stroke to impart a return stroke to the support which returns the feed finger to home position for engagement with the next piece to be advanced, said support being mounted for lateral movement of the feed finger into and displacement from the guideway, a follower on the reciprocal support, a first track to be traveled by the follower during the advance stroke and characterizing movement of the feed finger in the guideway to advance a work piece, a second track to be traveled by the follower during return movement and characterizing displacement of the feed finger from the guideway, and switch means to switch the follower to the second track when the feed finger attains the end of its advancing stroke and to return the follower to the first track when the feed finger attains its home position, said switch means being a switch plate itself presenting the second track.

9. In a magazine type feeder apparatus for a machine tool where work pieces are to be advanced to a locating position at a work station where each work piece is to have a tooling operation performed thereon: a magazine affording a guideway in which the work pieces are to move by gravity to a holding detent at a holding station in the guideway and from thence downward along the guideway to said locating position, a feed finger carried by a reciprocal support for movement of the feed finger longitudinally of the guideway, said feed finger having a home position where the finger is engaged with a work piece at the holding station, means to impart an advance stroke to the support to advance the so-engaged work piece along the guideway toward the work station and at the end of the advance stroke to impart a return stroke to the support which returns the feed finger to home position for engagement with the next piece to be advanced, said support being mounted for lateral movement of the feed finger into and displacement from the guideway, a follower on the reciprocal support, a first track to be traveled by the follower during the advance stroke and characterizing movement of the feed finger in the guideway to advance a work piece, a second track to be traveled by the follower during return movement and characterizing displacement of the feed finger from the guideway, switch means to switch the follower to the second track when the feed finger attains the end of its advancing stroke and to return the follower to the first track when the feed finger attains its home position, a stop shoulder in the path of the follower, and means causing the follower to engage the stop shoulder at home position if there is no work piece at holding position.

* * * * *